United States Patent [19]

Horiuchi et al.

[11] Patent Number: 5,437,035
[45] Date of Patent: Jul. 25, 1995

[54] METHOD AND APPARATUS FOR COMPILING A PROGRAM INCENDING A DO-STATEMENT

[75] Inventors: Takeshi Horiuchi, Kokubunji; Sumio Kikuchi, Machida, both of Japan

[73] Assignee: Hitachi, Ltd., Tokyo, Japan

[21] Appl. No.: 895,915

[22] Filed: Jun. 9, 1992

[30] Foreign Application Priority Data

Jun. 14, 1991 [JP] Japan ................ 3-143017

[51] Int. Cl.6 ................ G06F 5/00; G06F 9/30; G06F 9/44; G06F 9/38
[52] U.S. Cl. ................ 395/700; 395/375; 395/650; 395/800; 364/200; 364/300; 364/262; 364/DIG. 1; 364/DIG. 2
[58] Field of Search ................ 395/375, 800; 364/DIG. 1, DIG. 2

[56] References Cited

U.S. PATENT DOCUMENTS

| | | | |
|---|---|---|---|
| 4,802,091 | 1/1989 | Cocke et al. | 364/300 |
| 4,821,181 | 4/1989 | Iwasawa et al. | 364/200 |
| 5,067,068 | 11/1991 | Iwasawa et al. | 395/650 |
| 5,109,331 | 4/1992 | Ishida et al. | 395/375 |
| 5,247,696 | 9/1993 | Booth | 395/800 |

*Primary Examiner*—Kevin A. Kriess
*Assistant Examiner*—Majid Banankhah
*Attorney, Agent, or Firm*—Fay, Sharpe, Beall, Fagan, Minnich & McKee

[57] ABSTRACT

A method and apparatus for analyzing a DO-statement to determine the type of a DO-variable and for determining whether a sign of an incrementation parameter at the time of compile can be determined are provided in a DO-loop object code generator in a compiler to select an object code generating method corresponding to the state of the DO-loop. As a result, object codes fitted to each DO-loop are generated which are so efficient as to improve the iteration count according to the ANSI standard, saving of use of registers, elimination of unnecessary calculation and the like.

7 Claims, 9 Drawing Sheets

F I G. 4
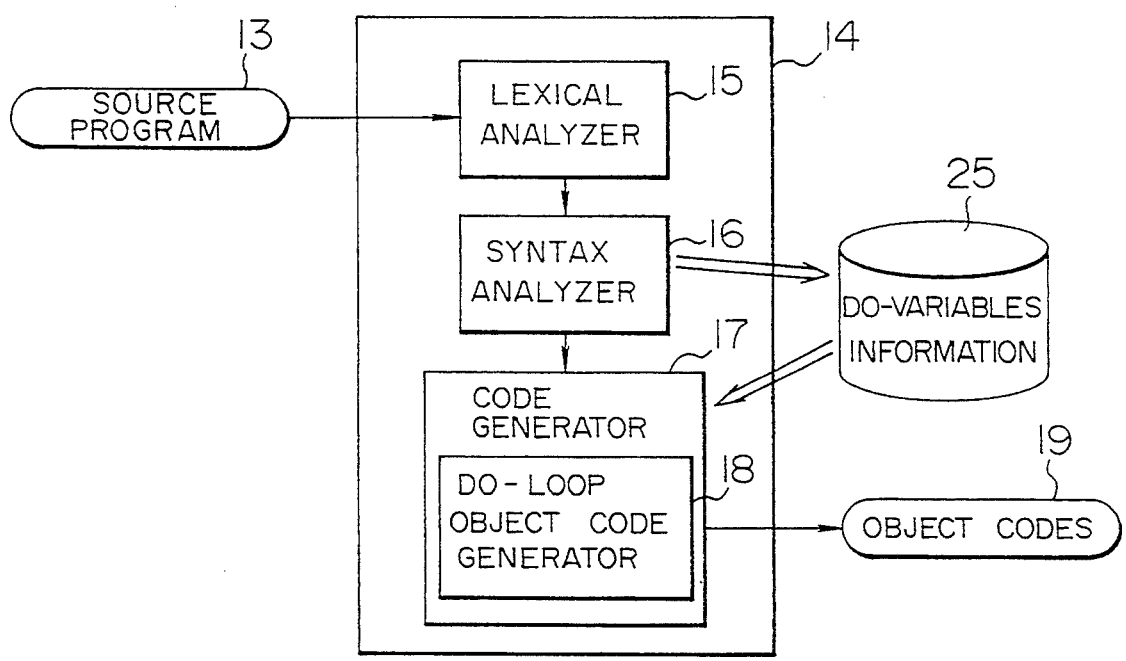

METHOD AND APPARATUS FOR COMPILING A PROGRAM INCENDING A DO-STATEMENT

BACKGROUND OF THE INVENTION

The present invention relates to a method for generating a compilation correctly and efficiently in a programming language processing system for generating an object program by compiling a source program.

A method for generating object codes for controlling a DO statement in a FORTRAN program is generally classified into two groups, namely, a loop length calculating method shown in FIG. 1 and a loop control variable addition method shown in FIG. 2. Either group is generally employed in this type of compiler. The DO statement used herein has the form of DO s i=a,b,c in which: i represents a DO-variable; a represents an initial parameter; b represents a terminal parameter; and c represents an incrementation parameter. In the case where the incrementation parameter c for the loop control variable in the loop control variable calculating method shown in FIG. 2 is identified to be positive, it can be simplified as shown in FIG. 3 (in the case where the incrementation parameter c is negative, it can be simplified in the same manner except that the inequality sign in the step 11a in FIG. 3 is reversed.

In FIGS. 1, 2 and 3, the step 5 represents a process for calculating the loop iteration count, the step 6 represents a process for performing branching on the basis of a judgment as to whether the iteration count is zero or not, the step 8 represents a process for subtracting the value of 1 from the iteration count, the step 9 represents a process for substituting the initial parameter into the DO-variable, the step 10 represents a process for performing branching on the basis of a judgment as to whether the incrementation parameter is positive or negative, each of the steps 11a and 11b represents a process for performing branching on the basis of a result of comparison between the DO-variable and the terminal parameter, and the step 12 represents a process for adding the incrementation parameter to the DO-variable.

The respective operations of the aforementioned two methods will be described hereunder. In the loop length calculating method in FIG. 1, the iteration count K is calculated in the step 5 just before the loop. The result of the calculation is generally stored in a register for the purpose of executing performance efficiency. Then, a judgment is made in the step 6 as to whether the iteration count K is zero or not. When the iteration count is zero, the loop is terminated. Otherwise, the loop body is processed in the step 7 and then the iteration count K is decreased by 1 in the step 8 before the controlling is returned to the judgment of the step 6. That is, this method is a method in which the loop is executed by iterating the processing of the loop body unless the iteration count calculated just before the loop and then renewed so as to be decreased by 1 for each execution of the processing of the loop body reaches zero.

For example, this loop length calculating method is described in HITAC Program Product VOS 3 Optimization FORTRAN 77 OFORT 77E2, HAP FORTRAN 77 Language, Hitachi Ltd., pp. 58–61.

In the loop control variable addition method in FIG. 2, the initial parameter a is substituted into the DO-variable i first in the step 9. The DO-variable i is generally stored in a register for the purpose of executing performance efficiency. Then, a judgment is made in the step 10 as to whether the incrementation parameter c is positive or not. The step 10 branches to the step 11a or to the step 11b on the basis of the result of the judgment. When the judgment of the step 11a proves that the DO-variable i is larger than the terminal parameter b or when the judgment of the step 11b proves that the DO-variable i is smaller than the terminal parameter b, the loop is terminated. Otherwise, the loop body is processed in the step 7 and then the incrementation parameter c is added to the DO-variable i in the step 12 before control is returned to the judgment of the step 10. That is, this method is a method in which the loop is executed by iterating the processing of the loop body unless the DO-variable i set to the initial parameter a and then renewed so as to be increased by the incrementation parameter c exceeds the terminal parameter b.

For example, this loop control variable addition method is described in HP 9000 series 300 computer FORTRAN/9000 REFERENCE, Yokogawa-Hewlett-Packard, Ltd., pp. 4–42 to 4–43.

On the other hand, M. Nakanishi and Y. Ohno, "Easy Compiler Generating Method", Kyoritsu Shuppan Co., Ltd., pp. 156–159 describes the use of the aforementioned two generating methods on the basis of grammatical interpretation of FOR statement (which can be interpreted in the same manner as DO statement).

In the case of use of the loop length calculating method in FIG. 1, one register in the inside of a processor for executing the object program should be used wastefully for storing the iteration count. There arises a problem in that the processor may be disturbed from generating efficient codes. In the case of use of the loop control variable addition method in FIG. 2, the judging step 10 for determining whether the step 11a or the step 11b is to be used as the loop end judging step as shown in FIG. 2 is required when the sign of the incrementation parameter is indefinable at the time of compile. There arises not only a problem in that the quantity of object codes is increased but a problem in that a wasteful conditional judging process must be carried out. In practice, the wasteful conditional branching may bring a tendency to increase pipeline stalling so that executing performance may become poor. Moreover, in use of this method, there arises a disadvantage in that the iteration count may unsatisfy the ANSI standard because of the influence of rounding error in real-number calculation when the DO-variable is of a real type.

According to the ANSI standard, the iteration count for a DO-loop with an initial parameter a, a terminal parameter b and an incrementation parameter c is defined by the following expression:

$$MAX(INT((b-a+c)/c), 0)$$

That is, the true iteration count by which the loop is really iterated may be different from the iteration count representedby the calculation expression according to the ANSI standard. Accordingly, the compiler according to the ANSI standard cannot be said to be an exact compiler.

Considering the aforementioned problems, it may be preferable that a program to be compiled is compiled while the loop length calculating method and the loop control variable addition method are suitably alternatively selected corresponding to the type of the program.

SUMMARY OF THE INVENTION

A chief object of the present invention is to provide an object generating method by which efficient object codes can be generated regardless of the type of program to be compiled.

Another object of the present invention is to provide an object code generating method suitable for the iteration count exactly satisfying the ANSI standard in the case where a DO-variable is not of an integer type.

Another object of the present invention is to provide an object code generating method in which wasteful conditional judging processes as described preliminarily can be avoided in the case where the sign of an incrementation parameter cannot be determined at the time of compile.

Another object of the present invention is to provide an object code generating method in which inefficient use of a register for storing the iteration count can be avoided in the case where the DO-variable is of an integer type and where the sign of the incrementation parameter cannot be determined at the time of compile.

According to the present invention, the type of the DO-variable is determined during compiling so that an object code generating process based on the loop length calculating method can be selected in the case where the DO-variable is of a real type.

According to the present invention, the sign of the incrementation parameter is determined during compiling so that an object generating process based on the loop length calculating method can be selected in the case where the sign of the incrementation parameter cannot be determined at the time of compiling.

According to the present invention, both the type of the DO-variable and the sign of the incrementation parameter as described above are determined so that an object generating method based on the loop control variable addition method can be selected in the case where the DO-variable is of an integer type and where the sign of the incrementation parameter can be determined at the time of compiling.

According to the present invention, the type of the DO-variable is determined so that object codes exactly satisfying the iteration count according to the ANSI standard can be generated by using the loop length calculating method in the case where the DO-variable is of a real type. On the contrary, in the case where the DO-variable is of an integer type, the sign of the incrementation parameter is determined so that object codes being so efficient as to be shortened in the code quantity by elimination of wasteful conditional judging processes to thereby suppress pipeline stalling caused by conditional judging/branching instructions can be generated by using the loop length calculating method in the case where the sign of the incrementation parameter cannot be determined at the time of compiling. Moreover, in the case where the aforementioned two types of judgments result in that the DO-variable is of an integer type and that the sign of the incrementation parameter can be determined, object codes exactly satisfying the iteration count according to the ANSI standard while suppressing wasteful use of resisters in the inside of a processor for performing object codes can be generated by using the loop control variable addition method.

BRIEF DESCRIPTION OF THE DRAWINGS

FIG. 4 is a block diagram showing an embodiment of a compiler according to the present invention;

DESCRIPTION OF THE PREFERRED EMBODIMENTS

Figure 1:
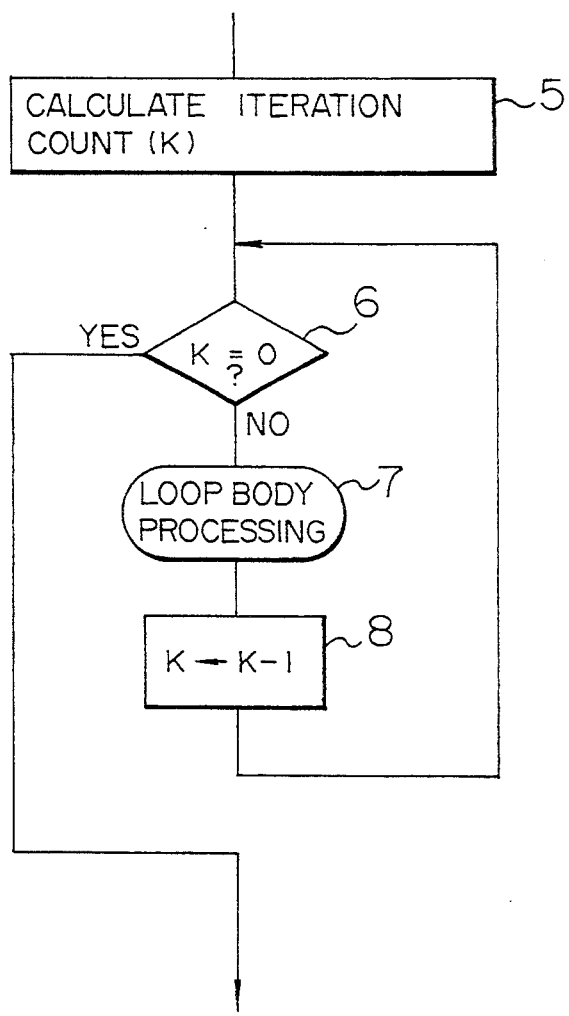
FIG. 1 is a conceptual view showing a loop length calculating method used in a part of the present invention.

Embodiments of the present invention will be described hereunder with reference to the drawings though the present invention is not limited to those embodiments.

A flow of processing by a compiler will be described now with reference to FIG. 4. A source program 13 as an input to a compiler body 14 is processed successively by a lexical analyzer 15 and a syntax analyzer 16 to form an input to a code generator 17. The code generator 17 includes a conventional code generating portion and a DO-loop object code generating portion 18 as a key of the present invention. Object codes 19 constituting an object program improved in efficiency as an output are generated by the code generator 17. Information of DO-variables is generated at the syntax analyzer 16, and stored in logical file 25. The information of DO-variables contains name and type of DO-variables and information of parameters. The logical file 25 may be created in the main storage (not shown) of the compiler.

The detailed operation of the DO-loop object generating portion 18 will be described with reference to FIG. 5.

The step 1 represents a processing portion for performing branching on the basis of a judgment as to the type of a DO-variable on the basis of information of DO-variables in the logical file 25, and the step 2 represents a processing portion for performing branching on the basis of a judgment as to the sign of an incrementation parameter for the loop control variable. The former judges, on the basis of the information of DO-variables, whether the DO-variable is of an integer type or of a real type, and the latter judges whether the sign is positive or negative or whether the sign is unknown (indefinable at the time of compile). Further, the step 3 represents a processing portion for generating codes by a loop length calculating method.

In the operation of the DO-loop object code generating portion 18, a judgment is made at step 1 as to whether or not the DO-variable in the DO-loop is of an integer type.

In the case where the DO-variable is not of an integer type, object codes are generated by the loop length calculating method in the step 4 to provide the iteration count exactly according to the ANSI standard.

Figure 2:
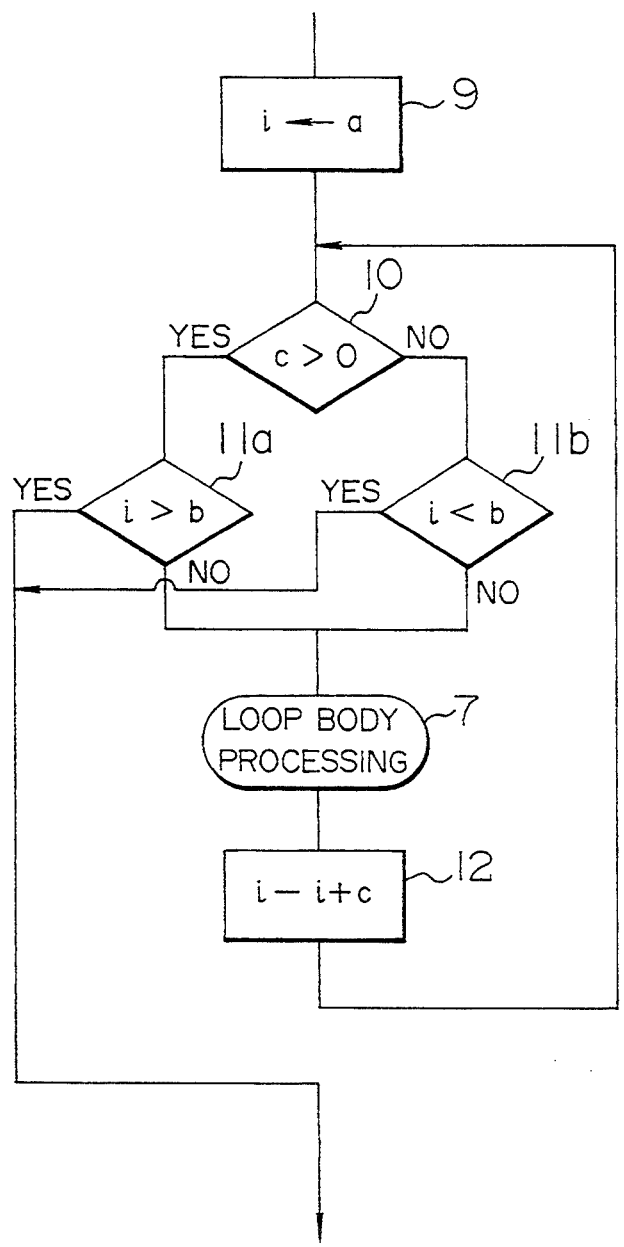
FIG. 2 is a conceptual view showing a loop control variable addition method used in a part of the present invention.
Figure 3:
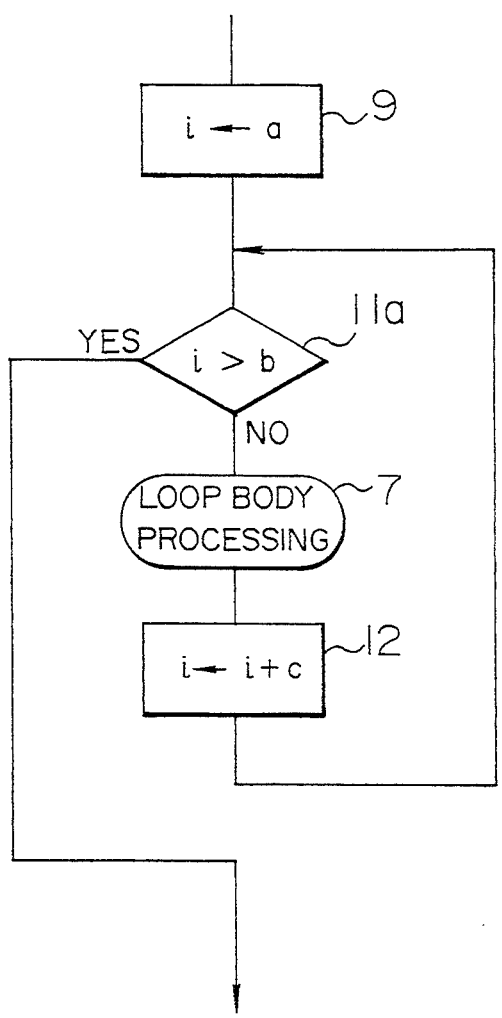
FIG. 3 is a conceptual view showing the loop control variable addition method shown in FIG. 2 under a specific condition.

On the contrary, in the case where the DO-variable is of an integer type, a judgment is made by the judging portion of the step 2 as to whether the sign of the incrementation parameter can be determined. In the case where the sign of the incrementation parameter cannot be determined, an object generating process according to the loop length calculating method is employed in the step 4 to avoid inefficient object codes and inefficient calculation as shown in the step 10 in FIG. 2. In the case where the sign of the incrementation parameter can be determined, the situation of the routine goes to the step 3 so that an object generating process according to the loop control variable addition method is employed to avoid inefficient use of registers. Although the embodiment in FIG. 5 has shown the case where the step 1 is carried out prior to the step 2, it is to be understood from the spirit of the present invention that the step 2 may be carried out prior to the step 1. The latter case is shown in FIG. 6. In each of FIGS. 5 and 6, blocks identified by like numerals represent like processes.

Figure 5:
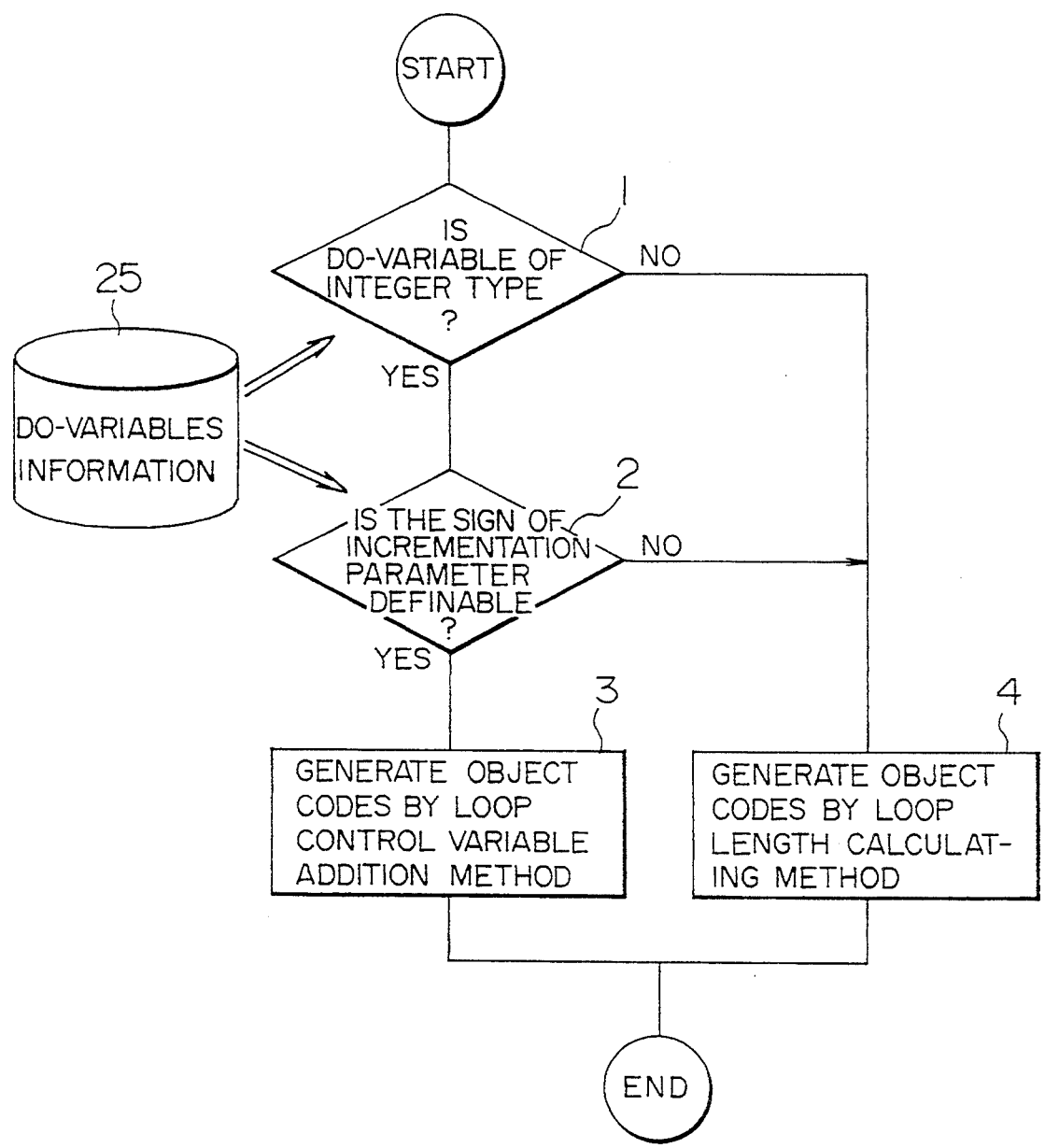
FIG. 5 is a flow chart showing an embodiment of the present invention.
Figure 6:
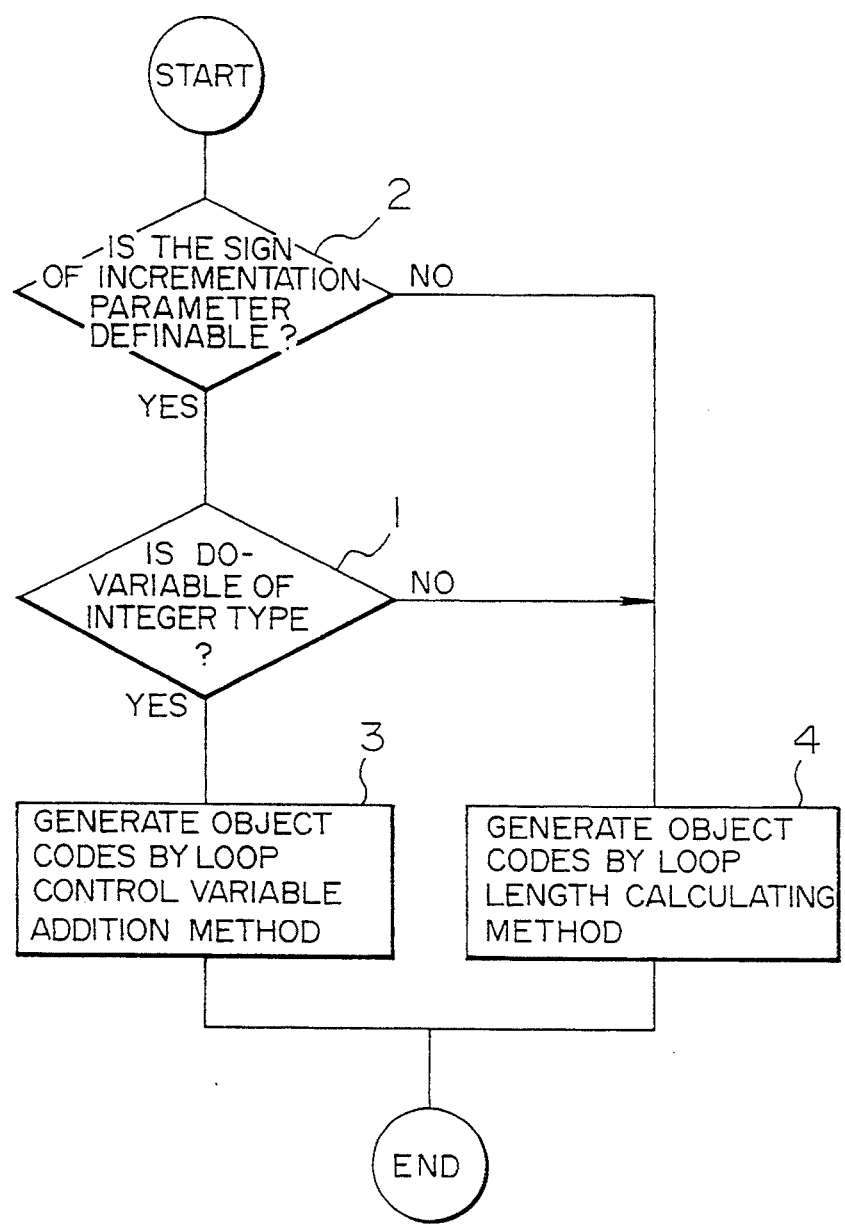
FIG. 6 is a flow chart showing another embodiment of the present invention.
Figure 7:
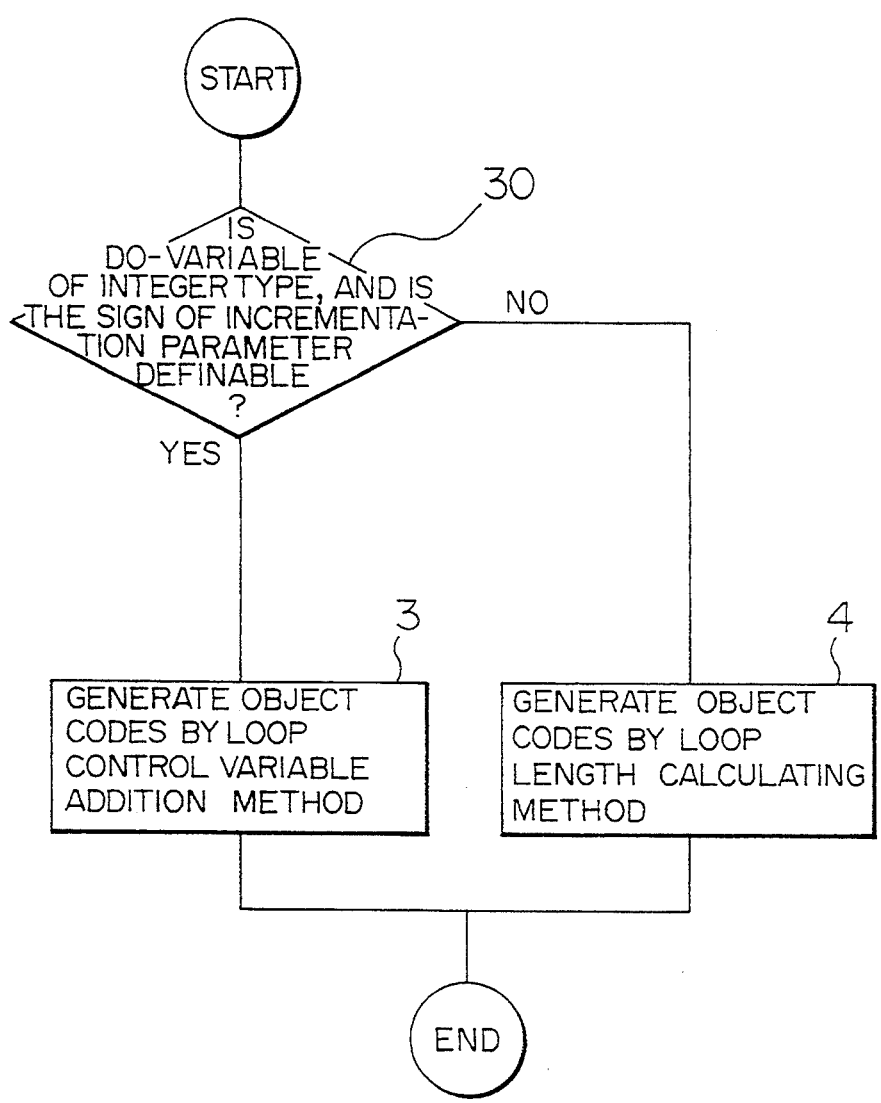
FIG. 7 is a flow chart showing a further embodiment of the present invention.

As a further embodiment, one judgment obtained by a combination of the steps 1 and 2 in the embodiment of FIG. 5 may be used. This embodiment is shown in FIG. 7. In FIG. 7, a determination is made, on the basis of the information of DO-variables, in the step 30 as to whether the DO-variable is of an integer type and whether the sign of the incrementation parameter is determinable. In the case where the result of the determination is YES, the situation of the routine goes to the step 3. In the case where the result of the determination is NO, the situation of the routine goes to the step 4.

Figure 8:
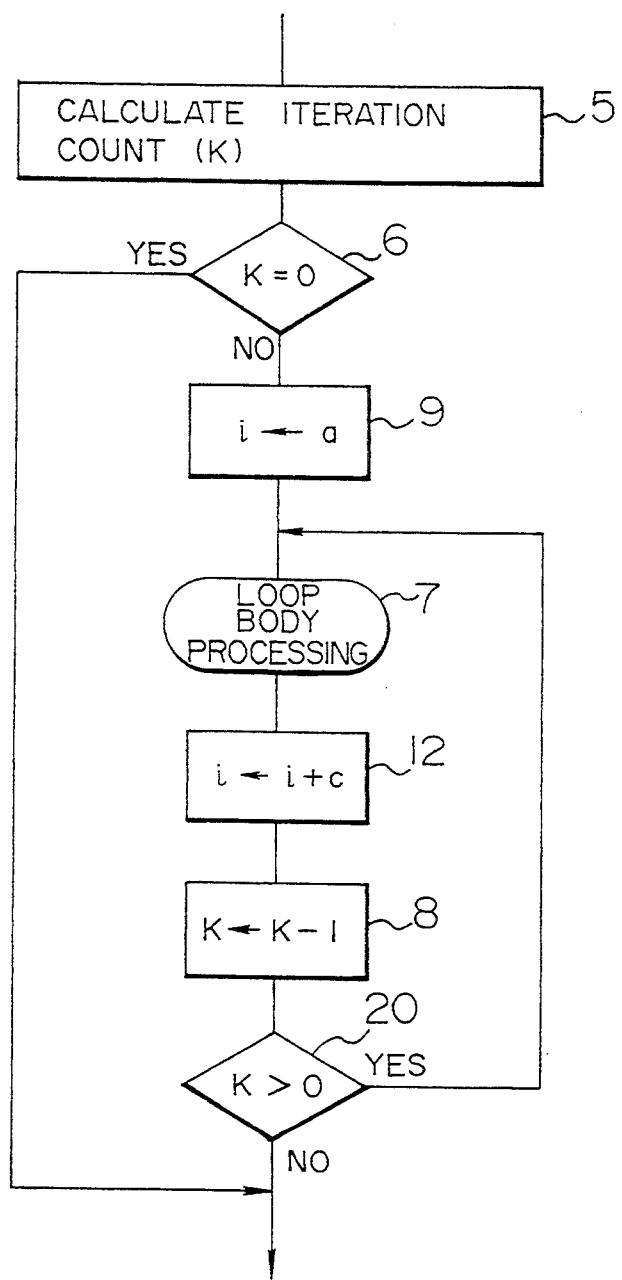
FIG. 8 is a flow chart showing the control structure of loop object codes generated by the loop length calculating method according to the present invention.
Figure 9:
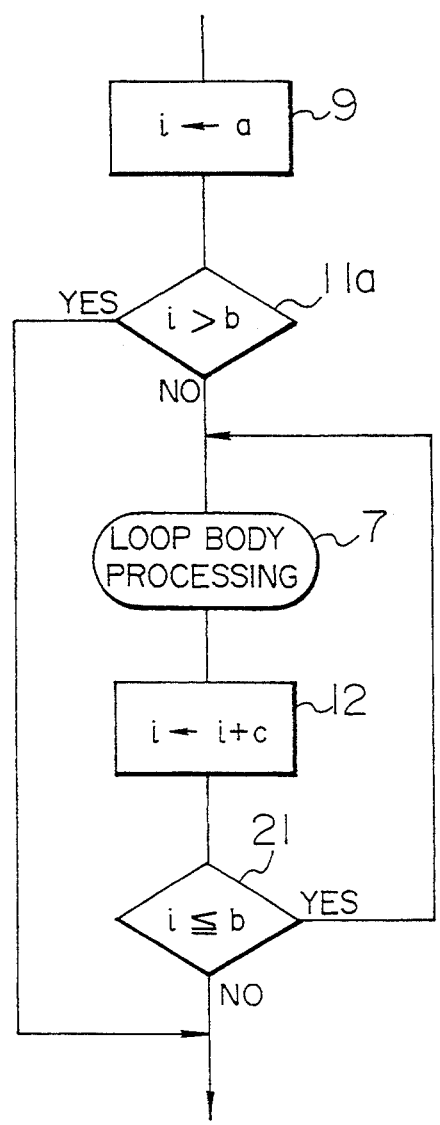
FIG. 9 is a flow chart showing the control structure of loop object codes generated by the loop control variable addition method according to the present invention.

More specific processes according to the loop length calculating method and the loop control variable addition method will be described with reference to FIGS. 8 and 9, respectively.

The loop length calculating method will be described now with reference to FIG. 8. In the drawing, the step 20 represents a processing portion for performing branching on the basis of a determination as to whether the iteration count is more than 0. In this method, the iteration count (K) is calculated in the step 5 (the result being generally put in a register). When the determination at step 6 proves that the value is zero, the routine is terminated. Otherwise, an initial parameter is substituted into the DO-variable (generally put in a register) in the step 9 and then the loop body is processed in the step 7. Then, an incrementation parameter is added to the DO-variable in the step 12 to renew the DO-variable and then the iteration count is decreased by 1 in the step 8. When the judging portion of the step 20 proves that the iteration count is positive, the processing of the loop body is iterated (step 7). Otherwise, the loop procedure is terminated. In the case of this method, the procedure of the steps 9 and 12 may be unnecessary if the DO-variable is merely used for counting the iteration count and is not referred to by the loop body.

Finally, the loop control variable addition method will be described with reference to FIG. 9. For the convenience of description, the incrementation parameter is assumed to be positive. In the drawing, the step 21 represents a processing portion for performing branching on the basis of a judgment as to whether or not the DO-variable reaches its terminal value. In this method, an initial parameter is substituted into the DO-variable (generally put in a register) first in the step 9. When the step 11a determines that the DO-variable has a larger value than the terminal parameter, the routine is terminated. Otherwise, the loop body is processed in the step 7 and then an incrementation parameter is added to the DO-variable in the step 12 to renew the DO-variable. When the step 21 determines that the DO-variable has a value not larger than the terminal parameter, the situation of the routine goes back to the processing of the loop body again. When the DO-variable takes a larger value than the terminal parameter, the routine is terminated.

Although description has been made on the case where the incrementation parameter is positive, the same routine as described above except that the inequality signs in the steps 11a and 21 in the drawing are reversed, may be applied to the case where the incrementation parameter is negative. That is, when the first determination proves that the value of the DO-variable into which the initial parameter is substituted is smaller than the terminal parameter, the routine is terminated.

When step 21 determines that the DO-variable renewed by addition of the incrementation parameter thereto is smaller than the terminal parameter, the routine is terminated.

As described above, according to the present invention, there is shown an effect that object codes exactly satisfying the ANSI standard are generated on the basis of selection of the loop length calculating method in the case where the DO-variable is decided to be a real type by using means for deciding the type of the DO-variable during compiling.

Furthermore, there is another effect that object codes being suitable for suppressing efficient use of a register storing the iteration count and exactly satisfying the ANSI standard are generated on the basis of selection of the loop control variable addition method in the case where the sign of the incrementation parameter in the DO-loop is definable at the time of compile by using means for determining the sign of the incrementation parameter during compiling.

Moreover, also an effect is provided that object codes being suitable for elimination of inefficient conditional judging/branching processes and for suppression of stalling of pipeline control are generated on the basis of selection of the loop length calculating method in the case where the sign of the incrementation parameter cannot be determined during compiling. That is, the process for generating object codes constituting a DO-loop can be changed on the basis of information obtained during compiling, so that an effect is provided that exact and efficient object codes satisfying the ANSI standard are generated.

What is claimed is:

1. A compiling method for generating object codes from a source program with a compiler which implements a loop length calculating process and a loop control variable addition process, which compiling process comprises computer implemented steps of:
   (a) with said compiler, analyzing during a compiling process whether a sign of an incrementation parameter in a DO-statement in said source program is determinable as plus or minus;
   (b) with said compiler, implementing the loop length calculating process to generate object codes of a DO-loop corresponding to said DO-statement in response to the analyzing in the step (a) determining that said sign is not determinable; and (c) with said compiler, implementing the loop control variable addition process to generate object codes of the DO-loop corresponding to said DO-statement in accordance with the loop control variable addition process; in response to the analysis in the step (a) determining that said sign is determinable.

2. A compiling method for generating object codes from a source program by a compiler during a compiling process, which comprises the computer implemented steps of:

(a) with said compiler, analyzing whether a DO-variable in a DO-statement in said source program is of an integer type during the compiling process;

(b) with said compiler, implementing a loop length calculating process to generate object codes of a DO-loop corresponding to said DO-statement in response to the analysis in the step (a) determining that said DO-variable is not of the integer type;

(c) with said compiler, analyzing whether a plus or minus sign of an incrementation parameter in said DO-statement is determinable during the compiling process in response to the analysis in the step (a) determining that said DO-variable is of the integer type;

(d) with said compiler, implementing the loop length calculating process to generate object codes of a DO-loop corresponding to said DO-statement in accordance with the loop length calculating process; in response to the analysis in the step (c) determining that said sign is not determinable; and (e) with said compiler, implementing a loop control variable addition process to generate object codes of the DO-loop corresponding to said DO-statement in response to the analysis in the step (c) determining that said sign is determinable.

3. A compiling method for generating object codes from a source program by a compiler during a compiling process, which comprises the computer implemented steps of:

(a) analyzing, with said compiler, whether the sign of an incrementation parameter in a DO-statement in said source program can be determined during compiling;

(b) generating, with said compiler, object codes of a DO-loop corresponding to said DO-statement in accordance with a loop length calculating process when the analyzing in the step (a) determines that said sign is undeterminable;

(c) determining, with said compiler, whether a DO-variable in a DO-statement in said source program is of an integer type, when the analyzing in the step (a) determines that said sign is determinable;

(d) generating, with said compiler, object codes of said DO-loop corresponding to said DO-statement in accordance with the loop length calculating process when the determining in the step (c) determining that said DO-variable is not of the integer type;

(e) generating, with said compiler, object codes of said DO-loop corresponding to said DO-statement in accordance with a loop control variable addition process when the determining in the step (c) determines that said DO-variable is of the integer type.

4. A compiling method for generating object codes from a source program by a compiler during a compiling process, which comprises the computer implemented steps of:

(a) with said compiler, analyzing, a DO-statement in said source program and determining whether a DO-variable in said DO-statement in said source program is of a real type; and (b) with said compiler, generating object codes from a DO-loop defined by said DO-statement in accordance with a loop length calculating process when the analyzing in the step (a) determining that said DO-variable is of the real type.

5. A compiler for generating object codes from a source program during a compiling process, which comprises:

an input means for inputting said source program;

a lexical analyzer connected to said input means, the lexical analyzer performing lexical analysis on the inputted source program;

a syntax analyzer connected to said lexical analyzer, the syntax analyzer performing syntax analysis on said source program; and an object code generator connected to said syntax analyzer, said object code generator generating object codes corresponding to said source program, said object code generator including a DO-statement code generator for generating object codes for a DO-statement in said source program through a process including the steps of:

(a) analyzing whether a DO-variable in a DO-statement in said source program is of an integer type, and whether sign of an incrementation parameter in said DO-statement in said source program is determinable during compiling;

(b) generating object codes for said DO-loop defined by said DO-statement in accordance with a loop length calculating process when the analyzing in the step (a) determines that said sign of said incrementation parameter is undeterminable; and (c) generating object codes for said DO-loop defined by said DO-statement in accordance with a loop control variable addition process when the analyzing in the step (a) determines that said sign of said incrementation parameter is undeterminable.

6. A compiling method for generating object codes from a source program with a compiler which includes an analyzer for analyzing type information of a DO-variable and a sign of an incrementation parameter with respect to a DO-statement in said source program by said compiler during a compiling process of said source program, said method comprising the computer implemented steps of:

(a) generating, with said compiler, object codes of a DO-loop corresponding to said DO-statement in accordance with a loop control variable addition process in response to said analyzer showing that the DO-variable is of an integer type and the sign of the incrementation parameter is determinable to be either plus or minus; and (b) otherwise, generating, with said compiler, object codes of the DO-loop corresponding to said DO-statement in accordance with a loop length calculating process.

7. A compiler for generating object codes from a source program during a compiling process, the compiler comprising:

a means for determining at least one of (1) whether a sign of an incrementation parameter in a DO-statement in the source program is determinable and (2)

whether a DO-variable in the DO-statement in the source program is of an integer type;

a loop length calculating means for implementing a loop length calculating process to generate object codes of a DO-loop corresponding to said DO-statement in response to the determining means determining at least one of (1) that the sign is undeterminable and (2) that the DO-variable is not of the integer type; and a loop control variable addition means for implementing a loop control variable addition process to generate object codes of the DO-loop corresponding to said DO-statement in response to the determining means determining (1) that said sign is determinable and (2) that said DO-variable is of the integer type.

* * * * *

UNITED STATES PATENT AND TRADEMARK OFFICE
CERTIFICATE OF CORRECTION

PATENT NO. : 5,437,035
DATED : July 25, 1995
INVENTOR(S) : Takeshi Horiuchi, et al.

It is certified that error appears in the above-indentified patent and that said Letters Patent is hereby corrected as shown below:

On title page, item

[54] In line 2 of the title, delete "INCENDING" and substitute therefore --INCLUDING--.

Col. 1, line 3, "INCENDING" should read --INCLUDING--

Claim 1, column 7, line 8, after "process" delete ";".

Claim 2, column 7, line 32, delete ";".

Claim 5, column 8, line 31, before "sign" insert --a--.

Signed and Sealed this

Nineteenth Day of September, 1995

Attest:

BRUCE LEHMAN

*Attesting Officer*     *Commissioner of Patents and Trademarks*